April 23, 1929.  O. R. ROUX  1,709,879
ROTARY VALVE
Filed Sept. 23, 1927  2 Sheets-Sheet 1

INVENTOR
Octave René Roux
ATTORNEYS
Synnestvedt & Lechner

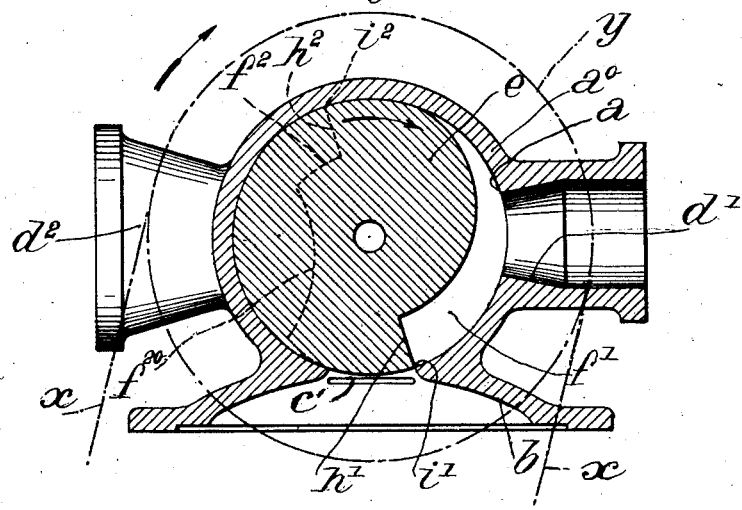
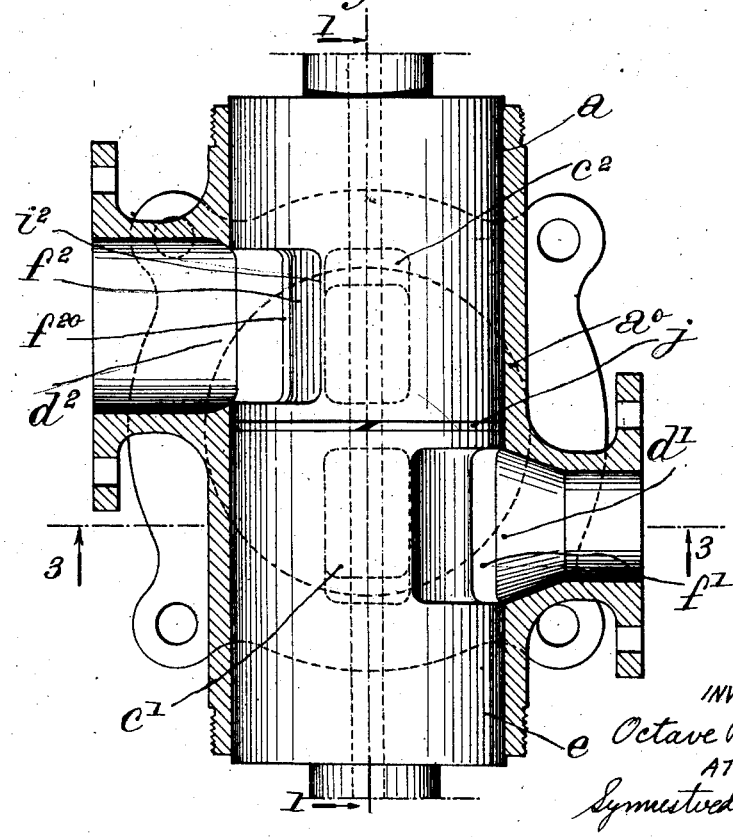

Patented Apr. 23, 1929.

1,709,879

UNITED STATES PATENT OFFICE.

OCTAVE RENÉ ROUX, OF GARCHES, FRANCE, ASSIGNOR TO MOTOR RESEARCH COMPANY, OF NEW YORK, N. Y.

ROTARY VALVE.

Application filed September 23, 1927, Serial No. 221,444, and in Belgium October 2, 1926.

The present invention relates to rotary valves and more particularly to those of the type adapted to be used in internal combustion engines for controlling the periodic feed of fuel vapors and discharge of burnt gases.

One of the objects of the invention is to provide a rotary valve or valves having specially shaped passages formed therein which increase the operating efficiency of the motor.

Another object is to provide a special form of passage designed to facilitate the intake of fuel, and a modified form of passage for assuring a rapid and efficient discharge of burnt gases.

Still another object is to so form the passages in the rotary valve that the pressure of the inflowing and outflowing gases serves partially as motive power for the rotation of the valve.

Further objects will appear in the course of the detailed description now to be given in connection with the accompanying drawings in which:

Fig. 3 is a section taken on line 3—3 of Figs. 1 and 4;

Fig. 4 is a horizontal section taken along line 4—4 of Fig. 1.

For the sake of clearness, the invention will be described as applied to a vertical single-cylinder, 4-cycle engine; but it is to be understood that the invention may, equally well be applied, with such modifications as will be obvious to those skilled in the art, to engines having a plurality of cylinders and operating in some other timed relation than that of the 4-cycle engine.

Figure 1:
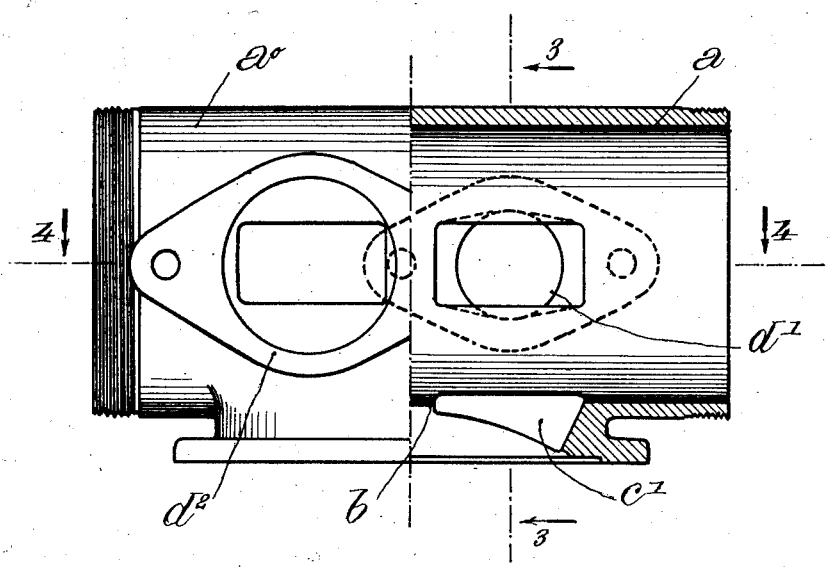
Fig. 1 is an elevation, partly in section, (the section taken on line 1—1 of Fig. 4) of a cylinder head fitted with feed and exhaust conduits and adapted to carry a rotary valve designed in accordance with one constructive embodiment of the invention.
Figure 2:
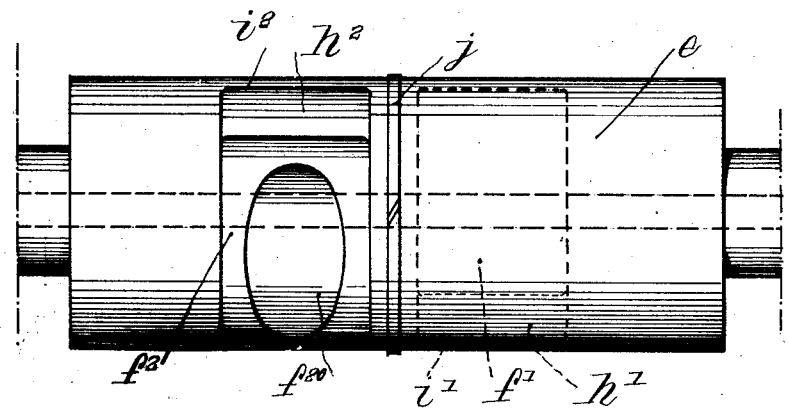
Fig. 2 shows in elevation, a form of valve adapted to coact with the cylinder head represented in Fig. 1.

Referring to Figs. 1 to 4 of the drawings, there is shown a casting $a^0$ adapted to be mounted in the manner of a cylinder head at one end of a cylinder (not shown), said casting comprising a machined cylindrical sleeve portion $a$, a domed surface $b$ forming one wall of the combustion chamber, an intake conduit $d^1$, and a discharge conduit $d^2$. The axes of conduits $d^1$ and $d^2$ lie in a common horizontal plane passing through the axis of sleeve $a$ and are arranged to be out of line with one another. Each conduit aligns exactly with a corresponding port or opening $c^1$ and $c^2$ communicating with the combustion chamber of the engine.

The cylinder head assembly is completed by a rotatable valve $e$ suitably journalled in bearings (not shown) and driven by a chain $x$ and sprocket wheel $y$ (Fig. 3) or by a train of gears, or in any other convenient way at half the speed of the main crank-shaft. Valve $e$ is formed with recesses $f^1$ and $f^2$ which serve as passages permitting free communication periodically between feed conduit $d^1$ and its intake port $c^1$, on the one hand, and between discharge port $c^2$ and its discharge conduit $d^2$, on the other. Recesses $f^1$ and $f^2$, differ from those hitherto provided in rotary valves of the type being described in that, in sections taken transversely of the valve axis, they present an outline having no axis of symmetry. Preferably, each of these recesses is shaped so as to have a maximum depth at the extremity which first comes into alignment with the corresponding conduit during rotation of the valve i. e. extremities $h^1$ and $h^2$ when the valve rotates in the direction of the arrow shown in Fig. 3. The depth of each recess then decreases progressively to a minimum at the extremity which is last to pass the opening of its corresponding conduit. Extremities $h^1$ and $h^2$ are shaped so as to function as blades in a turbine under the action of the inflowing and outflowing gas currents. Preferably they are made radial, as shown in the drawings, but it is to be understood that they may be made to slope so as to form either an acute or an obtuse angle with the tangent plane. Whatever their slope may be, it is essential that their turbine-blade function be preserved and that they present a sharp peripheral edge $i^1$ or $i^2$.

While a rotary valve having substantially identical intake and discharge recesses of the form shown for recess $f^1$ operates satisfactorily, it has been found that the operating efficiency may be further improved by modifying the shape of the discharge recess $f^2$ in the manner shown in Fig. 3. Here $f^2$ is in all respects the same as $f^1$ except that a supplementary pocket $f^{20}$ is provided extending from a point counterclockwise relatively to extremity $h^2$ to a point near the counter-clockwise extremity of $f^2$. This supplementary pocket increases the capacity of passage $f^2$ and permits a more rapid and complete discharge of the burnt gases from the cylinder.

In special circumstances, such as obtain in a compressor, it is found that both intake passage $f^1$ and discharge passage $f^2$ may advantageously be provided with supplementary pockets $f^{20}$.

In the modification shown in Fig. 4, a piston ring or a packing $j$, mounted in a suitable recess, may be interposed between the intake and discharge portions of the valve to insure against leakage in either direction.

The advantages of the above described valve assembly and, more particularly, of the specially shaped intake and discharge passages, over those hitherto constructed are (1) the piston is supplied with a large volume of fresh gas at the very beginning of the suction stroke and, simultaneously a strong suction is exerted on the carburetor, (2), the burnt gases flow into an enlarged discharge passage at the beginning of the discharge stroke and so expand very rapidly, (3) the radial extremities $h^1$, $h^2$ act as turbine blades under the pressure of both incoming and outgoing gases and diminish considerably the power taken from the crank-shaft or other source of power for rotating the valve.

The invention is not to be taken as being limited to the particular structures hereinbefore described but includes all constructions falling within the scope of the appended claims.

What I claim is:—

1. A rotary valve assembly comprising a shell adapted to carry a rotary valve element, said shell having a conduit associated therewith, and a valve element having a passage formed therein presenting a greater cross-sectional area adjacent one extremity than the other.

2. A rotary valve assembly comprising a shell adapted to carry a rotary valve element, said shell having a conduit associated therewith, and a valve element having a passage formed therein presenting a progressively increasing cross-sectional area between points adjacent the extremities thereof.

3. A rotary valve assembly comprising a shell adapted to carry a rotary valve element, said shell having a conduit associated therewith, and a valve element rotatably mounted in said shell, said valve element having a passage so formed therein that any section taken at right angles to the axis of rotation of the valve and passing through said passage presents the outlines of the passage as limiting an area which is asymmetric relatively to a radius bisecting the angle formed by the radii passing through the longitudinal extremities of the passage.

4. A rotary valve assembly comprising a shell adapted to carry a rotary valve element, said shell having a conduit associated therewith, and a valve element rotatably mounted in said shell, said valve element having a recess formed therein progressively increasing in depth between points adjacent the circumferential extremities of said recess.

5. A rotary valve assembly comprising a shell adapted to carry a rotary valve element, said shell having a conduit associated therewith, and a valve element rotatably mounted in said shell, said valve element having a recess formed therein which progressively increases in depth between points adjacent the circumferential extremities of said recess, and means operative to rotate the valve in the direction of increasing depth of said recess.

6. A rotary valve assembly comprising a shell adapted to carry a rotary valve element, said shell having a conduit associated therewith, and a valve element rotatably mounted in said shell, said valve element having a recess formed therein presenting a wall which successively is of progressively diminishing, then of increasing and finally of diminishing depth in passing from one extremity of the recess to the other.

7. A rotary valve assembly comprising a shell adapted to carry a rotary valve element, said shell having a conduit associated therewith and a valve element rotatably mounted in said shell, said valve element having a recess formed therein part of whose wall increases progressively in depth, another part of the wall being in the form of a pocket of greater depth than that portion of the wall which progressively increases in depth.

8. A rotary valve assembly comprising a shell adapted to carry a rotary valve element, said shell having a pair of conduits associated therewith, and a rotary valve element rotatably mounted in said shell, said rotary valve element having recesses formed in the periphery thereof positioned so as to align with said conduits during rotation of the valve element, one of said recesses having a wall which progressively increases in depth between points adjacent the circumferential extremities thereof.

9. A rotary valve assembly comprising a shell adapted to carry a rotary valve element, said shell having an intake conduit associated therewith, and a valve element rotatably mounted in said shell, said valve element having a recess formed therein whose wall presents one portion which progressively increases in depth between points adjacent the extremities of said recess and another portion which forms an angle with the peripheral surface of the valve element.

10. A rotary valve assembly comprising a shall adapted to carry a rotary valve element, said shell having an intake conduit associated therewith, and a valve element rotatably mounted in said shell, said valve element having a recess formed therein whose wall presents one portion which progressively increases in depth between points adjacent the extremities of said recess and another portion disposed substantially radially to the peripheral surface of the valve element.

11. A rotary valve assembly comprising a shell adapted to carry a rotary valve element, said shell having a pair of conduits associated therewith, the axes of said conduits being spaced along the longitudinal axis of the shell, and a rotary valve element having independent recesses formed in the periphery thereof positioned so as to align independently with one of said conduits during rotation of the valve element, one of said recesses having a wall which progressively increases in depth between points adjacent the circumferential extremities thereof.

In testimony whereof I have hereunto set my hand.

OCTAVE RENÉ ROUX.